(12) United States Patent
Ganapathiappan

(10) Patent No.: US 8,318,833 B2
(45) Date of Patent: Nov. 27, 2012

(54) POLYMER-ENCAPSULATED PIGMENT WITH AMPHIPHILIC PASSIVATION LAYER

(75) Inventor: Sivapackia Ganapathiappan, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1209 days.

(21) Appl. No.: 11/796,457

(22) Filed: Apr. 26, 2007

(65) Prior Publication Data
US 2008/0269374 A1  Oct. 30, 2008

(51) Int. Cl.
*C09D 11/02* (2006.01)
*C09D 109/00* (2006.01)
*C09D 123/00* (2006.01)

(52) U.S. Cl. ........ 523/201; 523/200; 523/202; 523/203; 523/204; 523/205; 523/206; 523/207; 523/208; 523/209; 523/210; 523/211; 523/212; 523/213; 523/214; 523/215; 523/216; 523/217

(58) Field of Classification Search ............ 523/201
See application file for complete search history.

(56) References Cited

U.S. PATENT DOCUMENTS

| | | | |
|---|---|---|---|
| 5,554,739 A | 9/1996 | Belmont | |
| 5,922,118 A | 7/1999 | Johnson et al. | |
| 5,990,202 A * | 11/1999 | Nguyen et al. | 523/201 |
| 6,057,384 A * | 5/2000 | Nguyen et al. | 523/160 |
| 6,225,372 B1 * | 5/2001 | Lykke et al. | 523/201 |
| 6,248,805 B1 | 6/2001 | Nguyen et al. | |
| 6,417,249 B1 | 7/2002 | Nguyen et al. | |
| 6,716,949 B2 | 4/2004 | Ganapathiappan et al. | |
| 6,767,090 B2 | 7/2004 | Yatake et al. | |
| 6,841,591 B2 | 1/2005 | Vincent et al. | |
| 6,858,301 B2 | 2/2005 | Ganapathiappan et al. | |
| 6,997,978 B2 | 2/2006 | Kabalnov et al. | |
| 7,030,175 B2 | 4/2006 | Vincent et al. | |
| 7,544,418 B2 * | 6/2009 | Vincent et al. | 428/407 |
| 2003/0029355 A1 | 2/2003 | Miyabayashi et al. | |
| 2003/0050362 A1 | 3/2003 | Sakai et al. | |
| 2003/0195274 A1 | 10/2003 | Nakamura et al. | |
| 2003/0225185 A1 | 12/2003 | Akers, Jr. et al. | |
| 2004/0063808 A1 | 4/2004 | Ma et al. | |
| 2004/0127639 A1 | 7/2004 | Wang et al. | |
| 2004/0157956 A1 | 8/2004 | Vincent et al. | |
| 2004/0157957 A1 | 8/2004 | Ganapathiappan et al. | |
| 2005/0113497 A9 * | 5/2005 | Ganapathiappan | 524/160 |
| 2006/0281834 A1 * | 12/2006 | Lee et al. | 523/201 |

OTHER PUBLICATIONS

Black Aqueous Pigment Dispersion: Cab-O-Jet 300. (Feb. 2009) available online at: http://www.cabot-corp.com/wcm/download/en-us/ij/CAB-O-JET%20300_0209.pdf.*

Black Aqueous Pigment Dispersion: Cab-O-Jet 200. (Feb. 2009) available online at: http://www.cabot-corp.com/wcm/download/en-us/ij/CAB-O-Jet%20200_0209.pdf.*

* cited by examiner

*Primary Examiner* — Ling Choi
*Assistant Examiner* — Darcy D LaClair Lynx

(57) ABSTRACT

The present invention is drawn to pigment suspensions, methods of forming pigment suspensions, and ink sets. The pigment suspension can comprise an aqueous liquid vehicle and a polymer-encapsulated pigment suspended in the liquid vehicle. The polymer-encapsulated pigment can include a pigment core, a passivation layer formed from a passivation component including an amphiphilic polymer and deposited on a surface of the pigment core, and a polymer-encapsulation layer attached to or deposited on the passivation layer.

18 Claims, No Drawings

POLYMER-ENCAPSULATED PIGMENT WITH AMPHIPHILIC PASSIVATION LAYER

BACKGROUND OF THE INVENTION

There are several reasons that ink-jet printing has become a popular way of recording images on various media surfaces, particularly paper and photo media substrates. Some of these reasons include low printer noise, capability of high-speed recording, and capability of multi-color recording. Additionally, these advantages can be obtained at a relatively low price to consumers. With respect to ink-jet ink chemistry, the majority of commercial ink-jet inks are water-based. Thus, their constituents are generally water-soluble, as in the case with many dyes, or water dispersible, as in the case with pigments. Furthermore, ink-jet inks have low viscosity to accommodate high frequency jetting and firing chamber refill processes common to ink-jet architecture.

With specific reference to pigment-based ink-jet inks, latex-containing ink-jet inks, and/or polymer-encapsulated pigments, there are special difficulties associated with maintaining appropriate dispersion stability, especially when the ink is to be jetted from a thermal ink-jet architecture. For example, polymer encapsulated pigments of various kinds are known, e.g., SUNSPERSE and FLEXIVERSE polymer coated pigments from Sun Chemical Corporation are representative. While certain encapsulation methods and chemistries are known, many polymer-encapsulated pigments are not very compatible with thermal ink-jet architecture. For example, these polymer surfaces can tend to cause pigments to either agglomerate under the high thermal shear conditions of the architecture firing chamber, causing nozzle and ink channel blockages, or have excessive glass transition temperatures that prevent room temperature print film formation. Thus, incorporation of such polymer encapsulated pigments within thermal inkjet inks either results in pen reliability reduction or poor print durability colorant performance, respectively. As a result, it would be desirable to provide methods, polymer-encapsulated pigments, inks, ink sets, and systems that provide improved polymer-encapsulated pigment colorants, which can be more readily adapted for use in thermal ink-jet architecture, among other applications.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

As used herein, "liquid vehicle" or "liquid medium" refers to the fluid in which polymer-encapsulated pigments of the present invention are dispersed to form a pigment suspension. Often, the pigment suspension itself can be used as an ink-jet ink, or more typically, the pigment suspension can become incorporated with other solvents, surfactants, etc., to form an ink-jet ink. Many liquid vehicles and vehicle components are known in the art. Typical liquid vehicles can include a mixture of a variety of different agents, such as surfactants, co-solvents, buffers, biocides, sequestering agents, viscosity modifiers, and water. Additionally, the terms "aqueous liquid vehicle" or "aqueous vehicle" refer to liquid vehicles that contain water as a solvent. Such vehicles may also contain additional co-solvents as is known in the art.

The term "colorant" can include dyes and/or pigments.

The term "pigment" generally includes pigment colorants, magnetic particles, aluminas, silicas, and/or other ceramics or organo-metallics, whether or not such particulates impart color. Thus, though the present description primarily exemplifies the encapsulation of pigment colorants, the term "pigment" can be used more generally to describe not only pigment colorants, but other pigments such as organometallics, ferrites, ceramics, etc. Sometimes, to provide information about the spatial relationship between the pigment and the encapsulating layers, the term "pigment core" is used, which refers to the component that is being encapsulated, and which is at the base of the three-layered polymer-encapsulated pigment.

As used herein, "amphiphilic polymer" refers to a polymer that has a hydrophobic part and a hydrophilic part. Generally, the hydrophobic part of the amphiphilic polymer can be deposited or adsorbed on the surface of the pigment and the hydrophilic part of the amphiphilic polymer can stabilize the pigment in solution.

As used herein, "passivation component" refers to amphiphilic polymers that are used to ultimately form a passivation layer on a pigment particulate.

As used herein, "passivation layer" refers to passivation component after it has been deposited on the surface of a pigment particulate.

As used herein, "polymer-encapsulation layer" is a layer of polymer or latex material that is deposited on or attached to a passivation layer, e.g., adsorption or covalent attachment, which is deposited on the surface of the pigment. Once the polymer-encapsulation layer is formed.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

It has been recognized that it would be advantageous to develop polymer-encapsulated pigments suitable for development over a wide variety of applications. In accordance with this, the present invention is drawn to compositions and methods or preparing compositions including a polymer-encapsulated pigment. The polymer-encapsulated pigment can comprise a pigment core, a passivation layer of an amphiphilic polymer, and a polymer-encapsulation layer. It is noted that when discussing a polymer-encapsulated pigment composition or a method of formulating such a pigment, each of these discussions can be considered applicable to each of these embodiments, whether or not they are explicitly discussed in the context of that embodiment. Thus, for example, in discussing the amphiphilic polymers present in a polymer-encapsulated pigment, those amphiphilic polymers can also be used in a method for making such pigments, and vice versa.

With these definitions in mind, a pigment suspension in accordance with embodiments of the present invention can comprise an aqueous liquid vehicle and a polymer-encapsulated pigment suspended in the liquid vehicle. The polymer-encapsulated pigment can include a pigment core, a passivation layer formed from a passivation component including an amphiphilic polymer and deposited on a surface of the pigment core, and a polymer-encapsulation layer attached to or deposited on the passivation layer.

In another embodiment, a method of making a polymer-encapsulated pigment can comprise the steps of a) dispersing a pigment in a liquid to form a pigment dispersion, b) forming a passivation layer on a surface of the pigment by contacting the pigment with an amphiphilic polymer, where the amphiphilic polymer has a hydrophobic part that interacts with a surface of the pigment and having a hydrophilic part that stabilizes the pigment in the liquid, and c) polymerizing at least one monomer in the presence of the pigment dispersion after forming the passivation layer, where the monomer can form a polymer encapsulation layer deposited on or attached to the passivation layer, thereby forming the polymer-encapsulated pigment. These steps can be performed sequentially in any functional order including performing simultaneous steps.

In another embodiment, an ink set, comprising multiple pigment suspensions where at least two (or more or all) inks are formulated in accordance with the embodiments described herein. For example, an ink set can comprise a first ink-jet ink and a second ink-jet ink (and optionally, third, fourth, fifth, sixth, etc., ink-jet inks). The first ink-jet ink can comprise a first aqueous liquid vehicle and a first polymer-encapsulated pigment colorant suspended in the first liquid vehicle. The first polymer-encapsulated pigment colorant can include a first pigment core, a first passivation layer deposited on a surface of the pigment core, and a first polymer encapsulation layer attached or deposited on the first passivation layer. The second ink-jet ink can comprise a second aqueous liquid vehicle and a second polymer-encapsulated pigment colorant suspended in the second liquid vehicle. The second polymer-encapsulated pigment colorant can include a second pigment core, a second passivation layer deposited on a surface of the second pigment core, and a second polymer encapsulation layer attached or deposited on the passivation layer. In this embodiment, the first pigment core and the second pigment core can be different pigment colorants, the first passivation layer and the second passivation layer can be formed of the same material, and the first polymer encapsulation layer and the second polymer encapsulation layer can be formed of the same material. This being stated by example, it is noted that the respective pigment cores, passivation layers, and/or polymer-encapsulation layers can be the same or different. The first and second liquid vehicle can also be the same or different.

The formation of pigment suspensions in accordance with the above embodiments provides several advantages. For example, polymer-encapsulation of pigments tends to reduce the number of total particles in solution (as opposed to having separate latex particulates co-dispersed with the pigments) and their combined surface areas such that the pigment suspension, e.g., ink, viscosity can be reduced. Such polymer-encapsulation also provides a particle dispersion where the particle surfaces are more uniformly charged, and are therefore more stable. Encapsulation also prevents pigment-latex separation when applied to a substrate, e.g., ink printed on a media substrate, such that durability and optical density are more optimized. Polymer-encapsulated pigments also facilitate the result that each pigment particle becomes trapped below the surface of latex formed films (after printing) such that gloss and color-to-color gloss uniformity is enhanced. Additionally, when preparing an ink set, by applying a passivation layer to the surface of each of the different pigments in the ink set, common polymer encapsulation layers can be applied to the surface of each of the different types of pigments without difficulty, which provides significant advantages in print quality, thermal ink-jet reliability, etc.

Without the passivation layer applied to a pigment surface as described above, in-situ monomer polymerization around individual pigments is made difficult because most pigments contain free radical quenching surface groups such as amino, phenol, hydroxyl, carbonyl, and immino groups. Such quenching disrupts polymer formation and adsorption on the pigment surface, and thus, can result in residual unreacted monomer in the finished product. In the present invention, pigment particles can be "passivated" by adsorption of a passivation layer on the surface of the pigment particle or pigment core. As such, the rate of subsequent polymerization can be increased such that the residual unreacted monomers present in the system are less than half of that present in similar systems that do not have passivation layers.

The passivation layer can be applied using a passivation component. The passivation layer can be formed by adsorption or attachment of the hydrophobic part of the amphiphilic polymer to the pigment core. Once formed, the adsorbed or attached passivation layer provides a surface that is suitable for latex or other polymers to be attached thereto. As mentioned, in one embodiment, the passivation layer "passivates" the pigment surface and creates a seed layer for monomer encapsulation, such as by an emulsion polymerization monomer feed process. This passivation layer can also create a suitable surface for subsequent polymer attachment.

Regarding the formation of the passivation layer per se, in one embodiment, the passivation component can be an amphiphilic polymer having a molecular weight of at least 10,000 Mw (weight average molecular weight). For example, polyvinylpyrrolidone having a 25,000 Mw can be added to a pigment dispersion such that the polyvinylpyrrolidone is attracted to the surface of the pigment. The polyvinylpyrrolidone can be adsorbed or attached to the surface through its hydrophobic structure thereby forming a passivation layer. Additionally, the hydrophilic structure of the amphiphilic polymer can stabilize the pigment in the liquid medium. This and other amphiphilic polymers can provide an excellent seed layer for emulsion polymerization of an encapsulating monomer and resultant polymer. As a particular benefit, the formation of the passivation layer and subsequent polymer encapsulation-layers can be carried out in a single semi-batch process. Additionally, it is noted that because the passivation layer is at least partially or even fully trapped by the hydrophobic latex polymer capsule, there is little consequence associated changing the environment of the liquid medium. Other advantages of the passivation layer is that it uniquely enables up to full latex polymer encapsulation of individual pigment particles of sufficient capsule thickness and capsule uniformity to provide both excellent thermal ink-jet printability and durable print film formation. It should be noted, however, that though these polymer-encapsulated pigments are particularly useful in thermal ink-jet architecture, the present invention is generally applicable to a wide variety of pigments and applications, including but not limited to paints, coatings, and other inks (including piezo ink-jet and other types of general printing inks).

Generally, the passivation component can be any amphiphilic polymer. Such polymers can be selected for process compatibility with emulsion polymerization process. Amphiphilic polymer that can be used with the compositions and methods described herein include without limitation polyvinylpyrrolidone, polyethylene glycol, poly(vinylpyrrolidone-co-vinyl acetate), poly(styrenesulfonate), poly(diallyldimethylammonium chloride), poly(ethylene-co-methacrylic acid), poly(ethylene-co-maleic acid), poly(styrene-co-maleic acid) and poly(vinylimidazole), block and random copolymers thereof, and mixtures thereof. Generally, the amphiphilic polymer has a molecular weight of at least 10,000 Mw. In one embodiment, the molecular weight can be at least 25,000 Mw. In another embodiment, the molecular weight can be at least 50,000 Mw. In yet another embodiment, the molecular weight can be at least 100,000 Mw. In still yet another embodiment, the molecular weight can be at least 500,000 Mw.

In addition to the general methods described above, there are several other methods that can be used to form the passivation layer and the polymer encapsulation-layer around a pigment particle. In a first embodiment, the encapsulating latex polymer can be formed in-situ around one or more pigment particles using an emulsion polymerization process. In this process, the pigment can be deaggregated and dispersed in water using standard shear processes, such as microfluidization, sonification, or milling, in the presence of surfactant, dispersing polymer or other dispersing moiety. The dispersed pigment particles can then be mixed with the passivation component, such that the passivation component is partially or fully dissolved in solution and forms a homogeneous mixture with the pigment. The passivation component then adsorbs or attaches to the surface of the pigment. Careful selection of pigment dispersant, ratios of pigment to passivation component, etc., can minimize the formation of pure passivation component polymer particles, as it is more desirable that the passivation component be formed primarily on the surface of the pigment particle.

Upon formation of the pigment particle with a passivation layer deposited thereon, a water-soluble initiator suitable for emulsion polymerization can then be introduced into the resultant solution passivation layer-deposited pigment particles with continuous stirring. An aqueous emulsion of latex forming monomers can be prepared and drop-wise introduced into the solution to "seed" onto and passivation layer of the pigment particles using emulsion polymerization synthesis. The thickness of the polymer or latex capsule can be any suitable thickness, but is typically greater than 50 nm to allow adequate film formation to occur on a media substrate upon printing. Typically, the selected pigment core can be sized below 150 nm, but is preferably below 100 nm in diameter, and the latex encapsulated particle diameter can be from about 200 to 300 nm, though diameters outside of this range may be appropriate as well for certain applications. Additionally, the passivation layer can have a thickness of about 5 nm to about 20 nm.

When applying the passivation layer to the surface of the pigment core, in one embodiment, the concentration range for the passivation component can be from 0.1 to 10 parts (preferably from 1 to 5 parts and most preferably from 2 to 3 parts) for every 10 parts of pigment by weight. In some embodiments, these ratios are helpful in striking a balance between generating enough of a passivation layer to be useful for subsequent polymer-encapsulation or pigment passivatation, and having too much passivation component in solution such that individual passivation component particles form. In other words, it is beneficial to have an appropriate amount of passivation component (compared to pigment particles) present such that a desirable amount of the passivation component becomes adsorbed or attached on the pigment particles, and not so much that the passivation component forms their own particles by collecting in solution.

In an alternative approach, a polymer or latex encapsulating polymer can be independently fabricated and subsequently bonded to the passivation layer of a pigment particle. This can be done by applying passivation layer described above to a pigment particle and combining the polymer or latex with the pigment particles under the action of solvents, milling, heat, or any combination of these. In one example, the polymer capsule material, e.g., latex particulates, solvent, and pigment can ball milled with zirconium balls for 24 hours. The solvent softens the latex such that milling adheres the latex to the passivation layer surface. In general, this approach does not lead to fully or uniformly encapsulated pigment, but these pigments can still be functional for use in thermal ink-jet architecture, as well as for other applications. This being stated, when adequately adhered to the passivation layer surface, the latex particle serves the same purpose as the in-situ processed particle described above.

Referring now in more detail to the polymer-encapsulation layer per se, in one embodiment, a latex polymer material can be used. The latex of the present invention is preferably prepared through conventional free radical addition of a monomer mixture through emulsion polymerization. Suitable monomers include styrene, methyl methacrylate, hexyl acrylate, hexyl methacrylate, butyl acrylate, butyl methacrylate, methyl acrylate, ethyl methacrylate, ethyl acrylate, isobutyl methacrylate, isobutyl acrylate, 2-ethylhexyl acrylate, 2-ethylhexyl methacrylate, octyl methacrylate, lauryl methacrylate, 4-methylsytrene and vinylbenzyl chloride, and mixtures thereof. Additionally, other suitable monomers are included in U.S. Pat. No. 6,057,384, which is incorporated herein by reference in its entirety. The latex can be a dispersion stabilized through incorporation of a monomer or monomers that promote latex surface charge. Such monomers are represented by acrylic acid, methacrylic acid, vinyl benzoic acid, and methacryloyloxyethylsuccinate. The charge forming monomers typically comprise from 0.5 wt % to 20 wt %, preferably 3 wt % to 10 wt %, of the monomer mix by weight and are typically neutralized after latex polymerization to form salts. Such salts may be formed through the reaction of a monomer carboxylic acid with potassium hydroxide or other similar salting agent. Particle dispersion stability is also influenced by particle density, which influences the ability of particles to settle within ink-jet architecture microchannels. In the present invention, the monomer mixture, pigment, passivation component, and monomer/polymer-pigment ratio can be selected to collectively produce particles having a density of 0.995-1.10 g/cm$^3$, preferably from about 1.03-1.05 g/cm$^3$. In most instances, the liquid vehicle of aqueous ink jet inks has a density on the order of 1.01-1.02 g/cm$^3$, though this is not required.

Steric stabilizers, such as surfactants, are generally also used to control the latex particle size during polymerization and can also be selected to provide additional pigment particle dispersion stability. Such stabilizers are often adhered to the encapsulated particle surface to minimize thermal stripping under thermal architecture firing conditions. This can be accomplished by matching the hydrophobicity of the latex monomer set and surfactant, and/or through incorporation of a reactive surfactant.

Additionally, the surface dielectric constant of the polymer-encapsulated pigments of the present invention can be from 2.0 to 3.0, and can be below 2.8 in one embodiment. This property can be useful to sufficiently anchor surfactants against thermal shear stripping in thermal ink-jet architecture. Stabilization can also be facilitated by the incorporation of 0.5 wt % to 5 wt %, preferably 1 wt % to 2 wt %, of addition of a multimer, preferably a dimer, capable of forming crosslinks between polymer chains in the latex particle. Such a multimer is represented by ethylene glycol dimethacrylate, for example. These narrow ranges of crosslinking have been found beneficial to maintain the integrity of the latex under the high thermal shear conditions of thermal ink jetting while not adversely impacting its room temperature film-forming properties. Such crosslinking is helpful for latexes having glass transition temperatures below 50° C. Room temperature film-forming latexes require glass transition temperatures in the range of 0° C. to 50° C., preferably 10° C. to 40° C. Higher glass transition temperature ranges may be selected when latex coagulation is accomplished at a higher than ambient temperature, for example by heated fuser roller. The latex may optionally contain color stabilizers that associatively protect the pigment colorant against photo, thermal and gaseous degradation.

In an alternate embodiment, a conventional core-shell latex structure may also be used, where the shell layer incorporates a monomer mix defined by the above surface charge monomer, multimer and dielectric constant specifications. The shell layer, in this case, provides thermal shear and dispersion stabilizing properties independent of the properties of the latex core. The core and shell polymers can collectively provide a latex particle having a bulk density and glass transition temperature as defined above for the monolithic latex. Core-shell latexes are prepared in a two step process; where in a first latex particle is synthesized and forms a seed for polymerization of the shell monomers around the seed particle in the second step. These types of core-shell latexes can be attached to the passivation layer adsorbed on the pigment particle. Alternatively, the core can refer to the pigment encapsulated by the passivation layer, and the shell can refer to the polymer-encapsulating material. In this embodiment, the core can be present in a range from about 15 wt % to about 25 wt % with a polymer shell in a range of from about 75 wt % to about 85 wt %. Still further, rather than a three-layered pigment structure, a four-layered pigment structure can be prepared that includes the pigment core, the passivation layer, the core (of the core-shell latex) attached to the passivation layer, and the shell (of the core-shell latex) attached to the core.

It is notable that relative surface tension relationships between the pigment core, passivation layer, and the polymer-encapsulation layer(s) can be used to form more specific compositions in accordance with embodiments of the present invention, e.g., uniform and fully encapsulating vs. partially encapsulating, etc. For example, when preparing the various layers of the polymer-encapsulated pigments, each successive layer can be formed to have a surface tension higher than the layer it is coating. In another embodiment, once the passivation layer is applied, it is possible to utilize post reactive processes to chemically lower the surface tension of the passivation layer and achieve a similar result. For example, a passivation layer can be formed that includes multiple monomers, where one of the monomers acts as a receptor site for post reaction purposes. Alternatively or additionally, a long alkyl chain species could be present or added that would lower the surface tension of the passivation layer surface.

With these parameters in place regarding some of the possible passivation layer-containing polymer-encapsulated pigments that can be formed, a discussion of dispersion fluids, e.g., inks, etc., is useful to exemplify how these pigments can be implemented for use in accordance with an embodiment of the present invention. Typically, inks include a pigment dispersed in a liquid vehicle. Typical liquid vehicle formulation that can be used with the latexes described herein can include water, and optionally, one or more co-solvents present in total at from 0 wt % to 30 wt %, depending on the jetting architecture. Further, one or more non-ionic, cationic, and/or anionic surfactant can be present, ranging from 0 wt % to 5.0 wt %. The balance of the formulation can be purified water, or other vehicle components known in the art, such as biocides, viscosity modifiers, materials for pH adjustment, sequestering agents, preservatives, and the like. Typically, the liquid vehicle is predominantly water.

Classes of co-solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this invention may range from 0 wt % to 5.0 wt %. It is to be noted that the surfactant that is described as being usable in the liquid vehicle is not the same as the surfactant that is described as being adhered to the surface of the latex particulate, though many of the same surfactants can be used for either purpose.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2.0 wt %, for example, can be used. Viscosity modifiers and buffers may also be present, as well as other additives known to those skilled in the art to modify properties of the ink as desired. Such additives can be present at from 0 wt % to 20.0 wt %.

In accordance with embodiments of the present invention, the polymer-encapsulated pigments of the present invention can be present in a pigment dispersion at from 1 wt % to 30 wt %. If the pigment dispersion is an ink-jet ink, the polymer-encapsulated pigments of the present invention can be present in a ink-jet ink at from 1 wt % to 10 wt %.

EXAMPLES

The following examples illustrate embodiments of the invention that are presently known. Thus, these examples should not be considered as limitations of the present invention, but are merely in place to teach how to make the best-known compositions of the present invention based upon current experimental data. As such, a representative number of compositions and their method of manufacture are disclosed herein.

Example 1

Preparation of a Polyvinylpyrrolidone Passivation Layer

A carbon black pigment (Printex 25 from Degussa Corporation) is mixed with the non-ionic surfactant Lutensol AT 50 (15 g) (available from BASF) in water (1635 ml). This mixture is stirred well and sonicated at 90% amplitude for 45 min using Branson Ultrasonicator model 450. The dispersion is microfluidized at least 3 passes at 90 psi to obtain a stable dispersion with 7.3% solid content. This pigment dispersion (75 g) is mixed with the passivation polymer of polyvinylpyrrolidone of molecular weight 40,000 Mw (1 g) in water (4 ml) and sodium dodecylsulfate (0.1 g). The dispersion is mixed well to coat and/or to adsorb the passivation polymer for a few hours. At this time, a thin coating of the polymer is formed on the pigment surface.

Example 2

Encapsulation of Carbon Black Pigment

The polyvinylpyrrolidone coated pigment dispersion prepared in accordance with Example 1 (75 g) is heated to 85° C. under nitrogen. The initiator potassium persulfate (0.15 g) is added followed by the emulsion over a period of 10 min. The emulsion is prepared by mixing styrene, hexyl methacrylate, 3-vinylbenzoid acid and ethylene glycol dimethacrylate in the ratio of 20/70/8/2 (4 g) in water (8 ml) containing sodium dodecylsulfate (0.1 g). The reaction mixture is heated at 85° C. for 19 h and cooled. It is then neutralized and filtered with 200 mesh filter to obtain encapsulated carbon black particles with 12.8% solid content.

Example 3

Encapsulation of Magenta Pigment

The same procedure is followed as described in Examples 1 and 2, except that a Fanal Pink D 4830 pigment is used rather than the Degussa Printex 25 carbon black pigment. Other colored pigments can be likewise prepared in accordance with these or other similar methods.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. A pigment suspension, comprising:
   a) an aqueous liquid vehicle; and
   b) a polymer-encapsulated pigment suspended in the liquid vehicle, said polymer-encapsulated pigment including:
      i) a pigment core;
      ii) a passivation layer deposited on a surface of the pigment core that is formed from a passivation component including an amphiphilic polymer selected from the group consisting of polyvinylpyrrolidone, polyethylene glycol, vinylpyrrolidone/vinyl acetate copolymers, poly(styrenesulfonate), poly(diallyldimethylammonium chloride), poly(ethylene-co-methacrylic acid), poly(ethylene-co-maleic acid), poly(styrene-co-maleic acid) and poly(vinylimidazole), block and random copolymers of vinylpyrrolidone, and mixtures thereof; and
      iii) a polymer-encapsulation layer attached to or deposited on the passivation layer,
   wherein the concentration range for the passivation component is from 2 to 3 parts for every 10 parts of pigment core by weight.

2. The pigment suspension of claim 1, wherein the pigment core is a pigment colorant, and the pigment suspension is an ink-jet ink.

3. The pigment suspension of claim 1, wherein amphiphilic polymer has a weight average molecular weight of at least 10,000.

4. The pigment suspension of claim 1, wherein amphiphilic polymer has a weight average molecular weight of at least 100,000.

5. The pigment suspension of claim 1, wherein amphiphilic polymer has a weight average molecular weight of at least 500,000.

6. The pigment suspension of claim 1, wherein the polymer-encapsulation layer is crosslinked by a crosslinking agent present within the polymer-encapsulation layer at from 0.5 wt % to 5 wt %.

7. The pigment suspension of claim 1, wherein the polymer-encapsulation layer is polymerized using at least one monomer selected from the group consisting of styrene, methyl methacrylate, hexyl acrylate, hexyl methacrylate, butyl acrylate, butyl methacrylate, methyl acrylate, ethyl methacrylate, ethyl acrylate, isobutyl methacrylate, isobutyl acrylate, 2-ethylhexyl acrylate, 2-ethylhexyl methacrylate, octyl methacrylate, lauryl methacrylate, 4-methylsytrene and vinylbenzyl chloride, and mixtures thereof.

8. The pigment suspension of claim 1, wherein the polymer-encapsulation layer includes copolymerized monomers formed in situ at the passivation layer such that the polymer encapsulation layer is covalently attached to or deposited on the passivation layer.

9. The pigment suspension of claim 1, wherein the polymer-encapsulation layer includes copolymerized monomers formed outside of the aqueous liquid vehicle and is subsequently covalently attached to or deposited on the passivation layer.

10. The pigment suspension of claim 1, wherein the polymer-encapsulated pigment is from 200 nm to 300 nm in diameter and the passivation layer has a thickness of from 5 nm to 20 nm.

11. The pigment suspension of claim 1, wherein the passivation layer and the pigment core comprise about 15 wt % to about 25 wt % of the polymer-encapsulated pigment, and the polymer-encapsulation layer comprises about 75 wt % to about 85 wt % of the polymer-encapsulated pigment.

12. An ink set, comprising multiple pigment suspensions, at least two of which being formulated in accordance with claim 1.

13. A method of formulating a polymer-encapsulated pigment dispersion, comprising:
   a) dispersing a pigment in a liquid medium to form a pigment dispersion;
   b) forming a passivation layer on a surface of the pigment by contacting the pigment with an amphiphilic polymer selected from the group of polyvinylpyrrolidone, polyethylene glycol, vinylpyrrolidone/vinyl acetate copolymers, poly(styrenesulfonate), poly(diallyldimethylammonium chloride), poly(ethylene-co-methacrylic acid), poly(ethylene-co-maleic acid), poly(styrene-co-maleic acid) and poly(vinylimidazole), block and random copolymers of vinylpyrrolidone, and mixtures thereof, said amphiphilic polymer having a hydrophobic part that interacts with a surface of the pigment and having a hydrophilic part that stabilizes the pigment in the liquid;
   c) polymerizing at least one monomer to form a polymer; and
   d) causing the polymer to become adsorbed or attached to the passivation layer, thereby forming a polymer encapsulation layer over the passivation layer, wherein the polymer-encapsulated pigment dispersion is formed,
   wherein the concentration range for the passivation component is from 2 to 3 parts for every 10 parts of pigment core by weight.

14. The method of claim 13, wherein steps a) to c) are sequential.

15. The method of claim 13, further comprising the step of adding at least one liquid vehicle component to the polymer-encapsulated pigment dispersion to form an ink-jet ink.

16. The method of claim 13, wherein the steps of polymerizing at least one monomer to form a polymer and causing the polymer to become adsorbed or attached to the passivation layer are carried out as a single step in the presence of the pigment dispersion after the passivation layer is at least partially formed.

17. The method of claim 13, wherein the at least one monomer is selected from the group of styrene, methyl methacrylate, hexyl acrylate, hexyl methacrylate, butyl acrylate, butyl methacrylate, methyl acrylate, ethyl methacrylate, ethyl acrylate, isobutyl methacrylate, isobutyl acrylate, 2-ethylhexyl acrylate, 2-ethylhexyl methacrylate, octyl methacrylate, lauryl methacrylate, 4-methylsytrene and vinylbenzyl chloride, and mixtures thereof.

18. The method of claim 13, wherein amphiphilic polymer has a weight average molecular weight of at least 10,000.

* * * * *

UNITED STATES PATENT AND TRADEMARK OFFICE
CERTIFICATE OF CORRECTION

PATENT NO.         : 8,318,833 B2  
APPLICATION NO.    : 11/796457  
DATED              : November 27, 2012  
INVENTOR(S)        : Sivapackia Ganapathiappan It is certified that error appears in the above-identified patent and that said Letters Patent is hereby corrected as shown below:

In column 10, line 37, in Claim 3, after "a" delete "weight".

In column 10, line 40, in Claim 4, after "a" delete "weight".

In column 10, line 43, in Claim 5, after "a" delete "weight".

In column 10, line 56, in Claim 7, delete "4-methylsytrene" and insert -- 4-methylstyrene --, therefor.

In column 11, line 19, in Claim 13, after "group" insert -- consisting --.

In column 12, line 25, in Claim 17, delete "4-methylsytrene" and insert -- 4-methylstyrene --, therefor.

In column 12, line 28, in Claim 18, after "a" delete "weight".

Signed and Sealed this  
Second Day of April, 2013

Teresa Stanek Rea  
*Acting Director of the United States Patent and Trademark Office*